United States Patent [19]

Schier

[11] Patent Number: 4,885,433

[45] Date of Patent: Dec. 5, 1989

[54] POSITION DETERMINING APPARATUS

[76] Inventor: J. A. Schier, 7105 Owens St., Tujunga, Calif. 91042

[21] Appl. No.: 292,947

[22] Filed: Jan. 3, 1989

[51] Int. Cl.$^4$ ............................................. G08C 21/00
[52] U.S. Cl. ...................................... 178/19; 340/707
[58] Field of Search ..................... 178/18, 19; 340/707

[56] References Cited

U.S. PATENT DOCUMENTS 4,794,634  12/1988  Torihata et al. ...................... 178/18

Primary Examiner—Stafford D. Schreyer
Attorney, Agent, or Firm—James E. Brunton

[57] ABSTRACT

An apparatus for precisely locating the position of a transmitter within either a plane or within a three dimensional space. More particularly the apparatus of the invention is adapted for use with a computer and includes a pen-sized movable transmitter, or mouse, whose exact position within a plane or three dimensional space can be determined without the use of any physical connection between the transmitter and the rest of the apparatus.

10 Claims, 3 Drawing Sheets

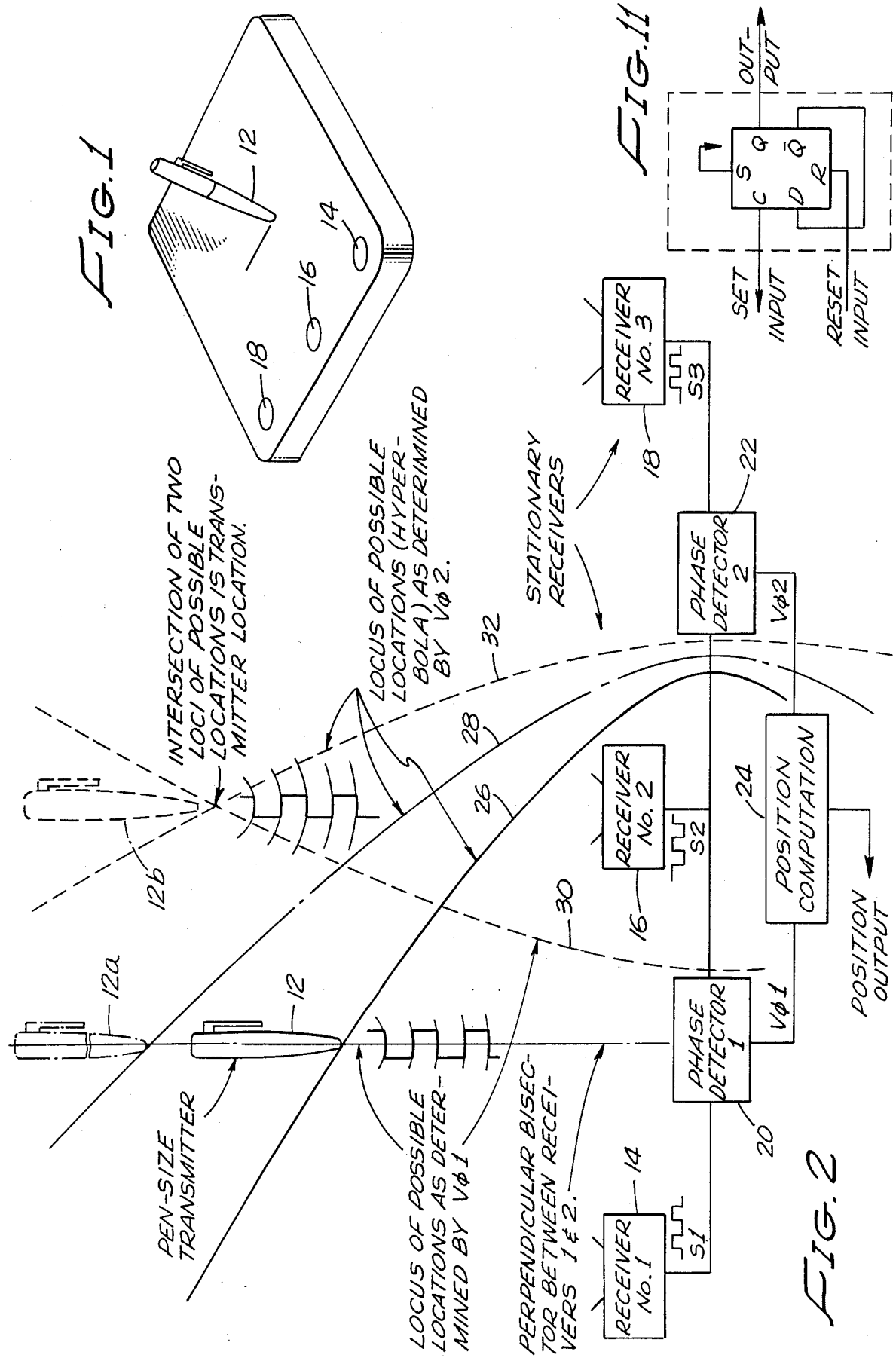

S1, S2 IN PHASE, S3 DELAYED W.R.T. S2 FOR CONFIGURATION SHOWN

S1, S2 IN PHASE, S3 DELAYED W.R.T. S2 FOR CONFIGURATION SHOWN

S1, S3 DELAYED W.R.T. S2 FOR THE CONFIGURATION SHOWN.

LASER DIODE DRIVER

POSITION DETERMINING APPARATUS

BACKGROUND OF THE INVENTION

1. Field of the Invention

The present invention relates generally to a position determining apparatus. More particularly the invention concerns an input device for use with a computer in which the transmitter of the device, or mouse, is in the configuration of a pen sized writing instrument.

2. Discussion of the Prior Art

The conventional prior art mouse comprises an input device, usually connected by a wire or other physical linkage to the computer. The mouse typically has a roller on its bottom designed to roll along the desk top beside the computer. When the mouse is moved, the cursor on the computer screen will move in the same direction that the mouse is moved.

The drawbacks of the conventional prior art mouse and of prior art position determining devices are several. In the first place the shape of the mouse is ill-suited for use as a writing instrument and disadvantageously requires some physical connection with the computer system. Further, the conventional mouse only has the ability to determine position changes relative to a previous position as opposed to being able to determine an absolute position relative to a fixed reference. Additionally, unlike the device of the present invention, many prior art position locating devices must be used with a special surface such as a digitizing tablet. Finally prior art position locating devices are typically two dimensional and cannot determine position three dimensionally.

SUMMARY OF THE INVENTION

It is an object of the present invention to provide an apparatus for precisely locating the position of a transmitter within either a plane or within a three dimensional space. More particularly it is an object of the invention to provide an input apparatus for use with a computer which includes a compact movable transmitter, whose exact position within a plane or three dimensional space can be determined without the use of any physical connection between the transmitter and the rest of the apparatus.

It is another object of the invention to provide apparatus of the aforementioned character in which the transmitter has the shape of a writing instrument such as a pen.

It is another object of the invention to provide a device of the character described in the preceding paragraph in which the absolute position of the pen-sized transmitter can be precisely determined relative to a fixed reference.

Another object of the invention is to provide an apparatus of the character described which does not require the use of any special writing surface.

A further object of the invention is to provide an apparatus of the class described in which the transmitter comprises a laser diode driver and in which the apparatus includes photodiode receivers for receiving signals from the transmitter.

BRIEF DESCRIPTION OF THE DRAWINGS

FIG. 1 is a generally perspective view of the one form of the apparatus of the invention.

FIG. 2 is a generally diagrammatic view illustrating the interaction among the various subsystems which comprise the apparatus of the invention.

FIG. 11 is a generally schematic view of one form of the phase detector device of the apparatus of the invention.

DESCRIPTION OF THE INVENTION

Figure 3:
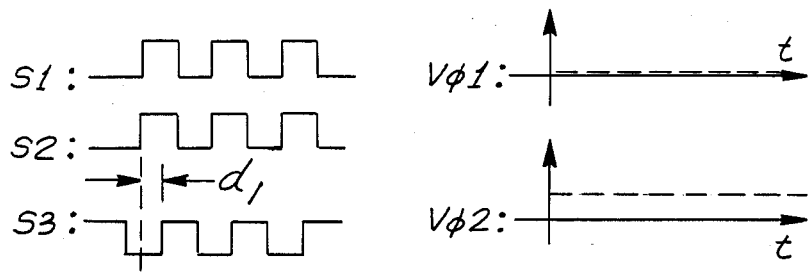
FIG. 3 is a generally diagrammatic view illustrating the phase relationship of the transmitter signals at the three receivers of the apparatus with the transmitter in a first location.

Referring to the drawings and particularly to FIGS. 1 and 2, one form of position determining apparatus of the present invention is there shown. In this embodiment of the invention the apparatus comprises transmitting means for transmitting a detectable signal and three coplanar, spaced apart receiving means for receiving the signal transmitted by the transmitting means. The transmitting means is here shown as comprising a housing 12 having the general configuration of a writing pen within which is mounted a laser diode adapted to emit a series of flashes of light. The receiving means, in turn, comprises first second and third receivers 14, 16, and 18 respectively, each being capable of sensing the flashes of light emitted by the laser diode. Upon sensing the flashes of light, each receiver generates and transmits corresponding first output signals as, for example, electrical signals.

As best seen in FIG. 2, the apparatus further includes first and second detector means here provided in the form of first and second phase detectors 20 and 22. Phase detector 20 is adapted to receive first output signals S1 and S2 from receivers 14 and 16 while phase detector 22 is adapted to receive first output signals S2 and S3 from receivers 16 and 18. Upon receiving signals S1 and S2 from receivers 14 and 16 respectively, phase detector 20 generates and transmits a second output signal V$\phi$1. Similarly, upon receiving signals S2 and S3 from receivers 16 and 18 respectively, phase detector 22 generates and transmits a third output signal V$\phi$2.

Cooperatively associated with phase detectors 20 and 22 is computation means shown here as a position computation device 24, for receiving and analyzing the second and third output signals transmitted by the phase detectors. The function and operation of the detector and computation means will be described more fully in the paragraphs which follow.

Referring now particularly to FIG. 2, with the transmitter positioned as shown by the solid lines, the device functions as follows:

Consider first the receivers 14 and 16, that is, the receivers, numbered 1 and 2. In the position indicated by the solid lines and the numeral 12, the transmitter is equidistant from receivers 1 and 2. Turning to FIG. 3, the signals detected by receivers 1 and 2, that is, S1 and S2 respectively, will be in phase with each other, and phase detector 1 will generate the appropriate second output signal, $V\phi 1$.

From the signal $V\phi 1$ it can be readily determined that the transmitter means must lie somewhere on a line which is equidistant from receivers 1 and 2. The line is shown in FIG. 2 as the perpendicular bisector between receivers 1 and 2. The exact position of the transmitter means along this line can be determined from the signals available from receivers 2 and 3.

With the transmitter in the position shown by the solid lines, it is obviously closer to receiver 2 than it is to receiver 3. Accordingly, by referring again to FIG. 3 it can be seen that the signal detected by receiver 2 will lead the signal S3 detected by receiver 3 and phase detector 2 will generate the appropriate third signal, $V\phi 2$.

From $V\phi 2$ it can be determined that the transmitter must lie on a line such that the distance from any point on the line to receiver 2 and the distance from the same point on the line to receiver 3 are different by an amount (a constant) that results in a phase difference, d1, as indicated in FIG. 3. This line is a hyperbola, designated in the drawings by the numeral 26, whose equation is determined uniquely by the phase difference d1 as indicated by the third signal $V\phi 2$ and the distance between receivers 2 and 3.

Having signals $V\phi 1$ and $V\phi 2$ available, the position of the transmitter within the plane defined by receivers 1, 2, and 3 can be readily determined. To recapitulate, with the transmitter in the position shown by the solid lines in FIG. 2, second signal $V\phi 1$ indicates that the transmitter lies on the perpendicular bisector between receivers 1 and 2. Further, third signal $V\phi 2$ indicates that the transmitter lies on the hyperbola 26 determined by the phase difference d1 and the distance between receivers 2 and 3. Since the transmitter lies on both the hyperbola 26 and the perpendicular bisector, the transmitter must be at the intersection of the hyperbola and the bisector as illustrated in FIG. 2.

The actual computation of the transmitter's position is carried out by the computation device 24. This device has as its input signals $V\phi 1$ and $V\phi 2$ from which the transmitter's position is determined.

Figure 4:
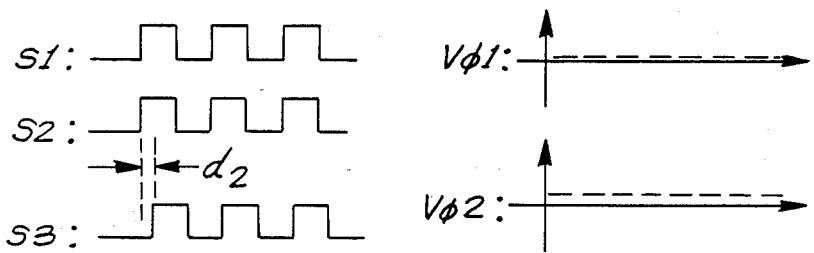
FIG. 4 is a diagrammatic view similar to FIG. 3, showing the phase relationship of the signals at the three receivers with the transmitter in a second location.

If the transmitter's position is altered to that shown by the phantom lines 12a in FIG. 2, it is still equidistant from receivers 1 and 2, but it is further away from the receivers. With the transmitter in this second position 12a, the operation of the apparatus is as follows:

Referring particularly to FIG. 4, signals S1 and S2 are still in phase since the transmitter remains on the perpendicular bisector between receivers 1 and 2. The signal from phase detector 1, that is, second signal still indicates this condition. However, as depicted in FIG. 4, signal S2 still leads signal S3 as before since the transmitter is still closer to receiver 2 than to receiver 3. However, the phase difference d2 is now smaller than d1 since the distances from the transmitter to receivers 2 and 3 is more nearly equal. In FIG. 4, the third signal $V\phi 2$, as determined by phase detector 2, reflects this change.

As before, having signals $V\phi 1$ and $V\phi 2$, the position of the transmitter can readily be determined. Signal $V\phi 1$ again indicates that the transmitter is located on the perpendicular bisector between receivers 1 and 2, and signal $V\phi 2$ indicates that the transmitter lies on a hyperbola 28 determined by signal $V\phi 2$ and the distance between receivers 2 and 3. Since $V\phi 2$ has changed, the hyperbola on which the transmitter lies has also changed. As before, since the transmitter lies on both the bisector and the hyperbola 28, it must be located at the point where the bisector and hyperbola 28 intersect. This position is readily calculated by the position computation means 24 using signals $V\phi 1$ and $V\phi 2$.

Figure 5:
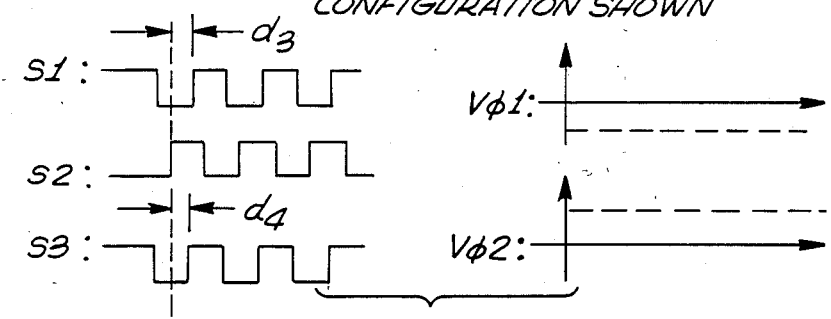
FIG. 5 is a generally diagrammatic view similar to FIGS. 3 and 4, but showing the phase relationship of the signals at the three receivers with the transmitter in a third location.

As a further illustration of the operation of this form of position determination apparatus, assume movement of the transmitter to the position 12b as indicated by the phantom lines designated as 12b in FIG. 2. The operation of the apparatus is now as follows:

The location of the transmitter is such that it is closer to receiver 2 than it is to receiver 1. This results in signal S2 leading S1, or equivalently, S1 is delayed with respect to S2. This condition is illustrated in FIG. 5. Correspondingly, signal $V\phi 2$ now indicates that S2 leads S3 by the amount d4.

With the transmitter in the location 12b, it no longer lies on a perpendicular bisector and a given hyperbola, but rather lies on two hyperbolae. One hyperbola 30 is uniquely determined by $V\phi 1$ and the distance between receivers 1 and 2, and the second hyperbola 32 is uniquely determined by $V\phi 2$ and the distance between receivers 2 and 3.

For the reasons previously discussed, the transmitter must lie on each of two different hyperbolae and more particularly must lie at the location 12b where the two hyperbolae 30 and 32 intersect.

It should be noted that in the simplified operation of the apparatus just described, information regarding the phase relationship between signals S1 and S3 was not used. In a minimal realization, this information is not necessary. However, if desired, this extra information could be used to improve the accuracy of the apparatus. Such a scheme would be useful in rejecting "noise" and making the apparatus generally more precise.

Figure 6:
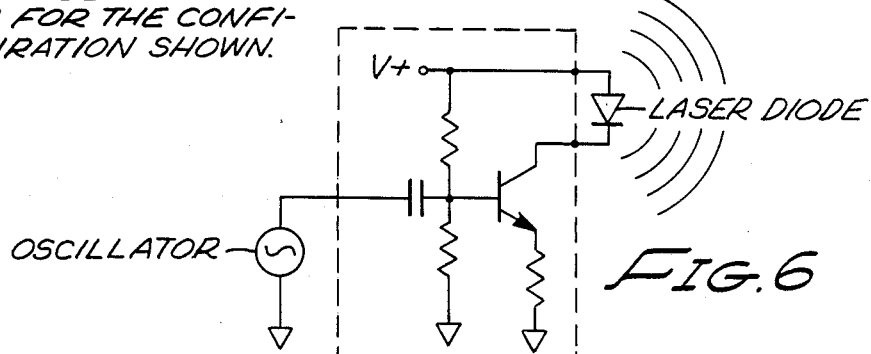
FIG. 6 is a generally schematic view of the circuitry of the basic transmitter of one embodiment of the apparatus of the invention.

Turning now to FIG. 6 there is illustrated a simple embodiment of the laser diode driver used in the transmitter of the instant form of the apparatus of the invention. The laser diode illustrated in this figure functions to emit the transmitted first, or light flash, signal described in the preceding paragraphs. The laser diode driver is responsible for applying the necessary power to the laser diode at a frequency dictated by the input oscillator. The circuitry shown in FIG. 6 is of a character well known to those skilled in the art and the details thereof will not be further described herein.

Figure 7:
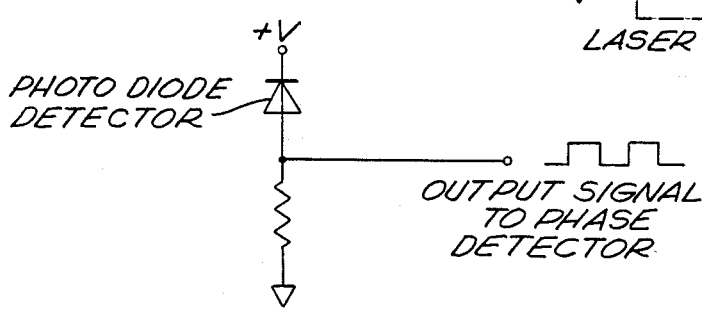
FIG. 7 is a generally schematic view illustrating the circuitry of the basic receiver of one embodiment of the apparatus of the invention.

Referring to FIG. 7, a simple receiver circuit is there illustrated. The signal from the transmitter is received by the photodiode detector. The detected signal is then passed to the phase detector in a manner well understood by those skilled in the art.

Figure 8:
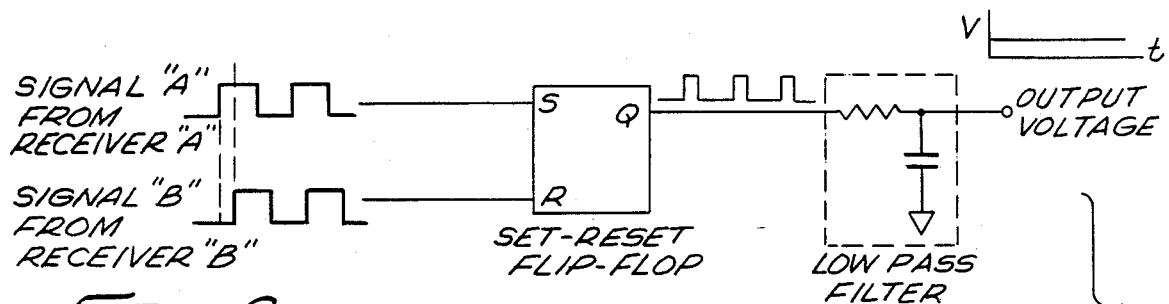
FIG. 8 is a generally schematic view showing the circuitry of basic phase detector of one form of the apparatus of the invention.

In FIG. 8 a simple phase detector arrangement is shown. The first stage of the phase detector is a set-reset flip-flop whose inputs are driven by signals from two receivers. Due to the nature of set-reset flip-flops, if the two received signals are exactly in phase, the output of the flip-flop, "Q", is always low. If the two signals are π radians (180 degrees) out of phase, the output of the flip-flop is a 50% duty cycle square wave. If the two signals are 2π radians (360 degrees) out of phase, the output of the flip-flop will always be high. In this fashion, the duty cycle of the flip-flop output varies linearly with the phase difference between the two input signals.

FIG. 8 also shows a low-pass filter following the output of the flip-flop. This filter has a cutoff frequency that is below the frequency of the input signals. Thus the filter allows only the DC and low-frequency components of the flip-flop output to pass. If the flip-flop output is a 50% duty cycle square wave, the output of the low-pass filter will be a voltage that is 50% of the square wave peak voltage. The plot of output voltage versus phase angle shows how the output of the phase detector rises linearly as the phase angle between the two input signals increases. Once again the construction and operation of the phase detector subassembly illustrated in FIG. 8 is well understood by those skilled in the art.

Before discussing alternate forms of the present invention, it is to be understood that the subsystems of the apparatus, that is the transmitter means, the receiver means, the detector means and the computation means can take several forms. The precise forms of the aforementioned means, as described in the preceding paragraphs and as illustrated in the drawings, are meant to be exemplary only. For example, the transmitter means can be such as to transmit various types of signals such as any electro-magnetic or acoustic radiation and any sort of modulation as, for example, frequency, amplitude, pulse width, phase and the like. Similarly the receiver means can take numerous forms adapted to receive the various types of signals that may be transmitted by the transmitter means. Additionally, the detector and computation means can take various forms of a character well understood by those skilled in the art, their precise form depending upon the end application of the apparatus of the invention.

Figure 10:
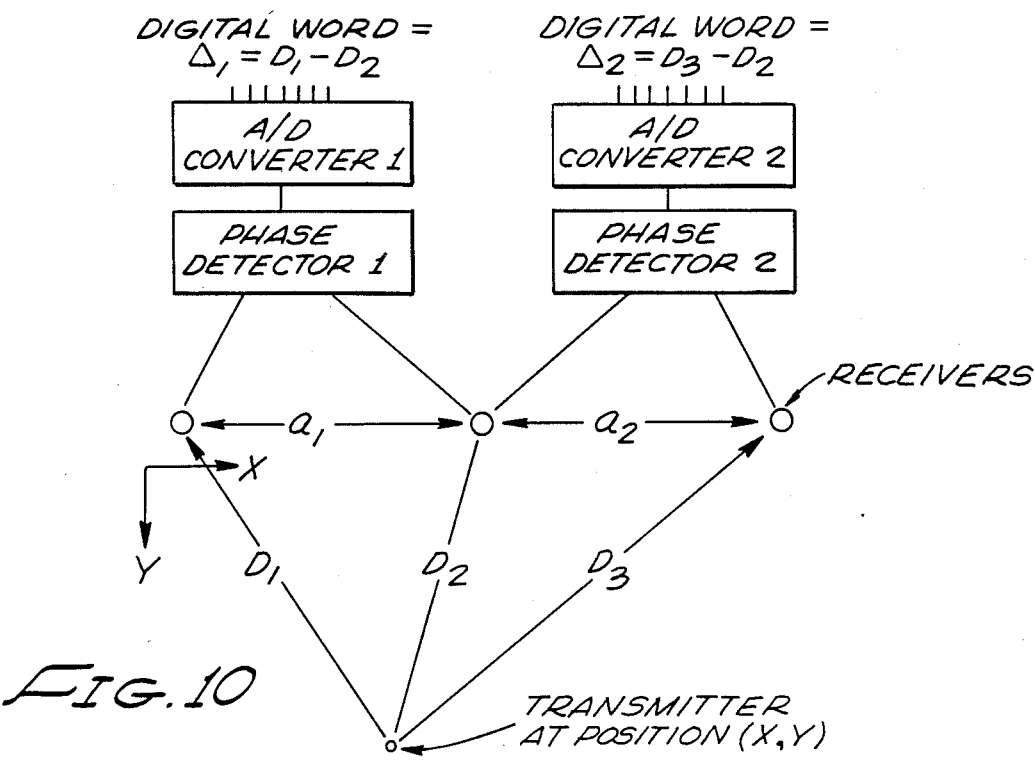
FIG. 10 is a generally diagrammatic view illustrating an alternate method of operation of the apparatus of the invention.

Turning to FIG. 10 an alternate approach for transmitter position determination with a plane is there schematically illustrated. The locations and configurations of the receivers, transmitter, and phase detector are substantially the same as described previously. However, analog-to-digital (A/D) converters have been shown for the purposes of explanation, but are not essential to the basic invention. Each of the A/D converters 36 and 38 has as its input the output of a phase detector hereshown as phase detectors 1 and 2. In such a configuration, the output of the A/D converter is a digital word that is equal (within a known constant multiplier) to the phase difference between the input signals to the phase detector. The digital word is also equal (within a known constant multiplier) to the difference between the distances from the transmitter to one receiver and from the transmitter to the other receiver.

The transmitter coordinates X and Y are the two unknown variables which are to be determined. Referring to FIG. 10 and the geometric relationships illustrated therein, we have the following mathematical relationships:

Using the Pythagorean Theorem:

$$D_1^2 = y^2 + x^2$$

$$D_2^2 = y^2 + (a_1 - x)^2$$

$$D_3^2 = y^2 + (a_1 + a_2 - x)^2$$

From the Measurements from the Phase Detectors:

$$\Delta_1 = D_1 - D_2$$

$$\Delta_2 = D_3 - D_2$$

$a_1$ and $a_2$ are known values (distances between the receivers), as are $\Delta_1$ and $\Delta_2$ (values measured by the phase detectors).

The five unknown values are $D_1$, $D_2$, $D_3$, X and Y. From these relationships, it is to be observed that there are 5 equations and 5 unknown variables. Given that the number of unknown variables is equal to the number of equations, these equations can be solved using any of a number of methods well known to those skilled in the art, a digital computer being one expedient means. With the equations solved, the transmitter coordinates X and Y will be known.

Figure 9:
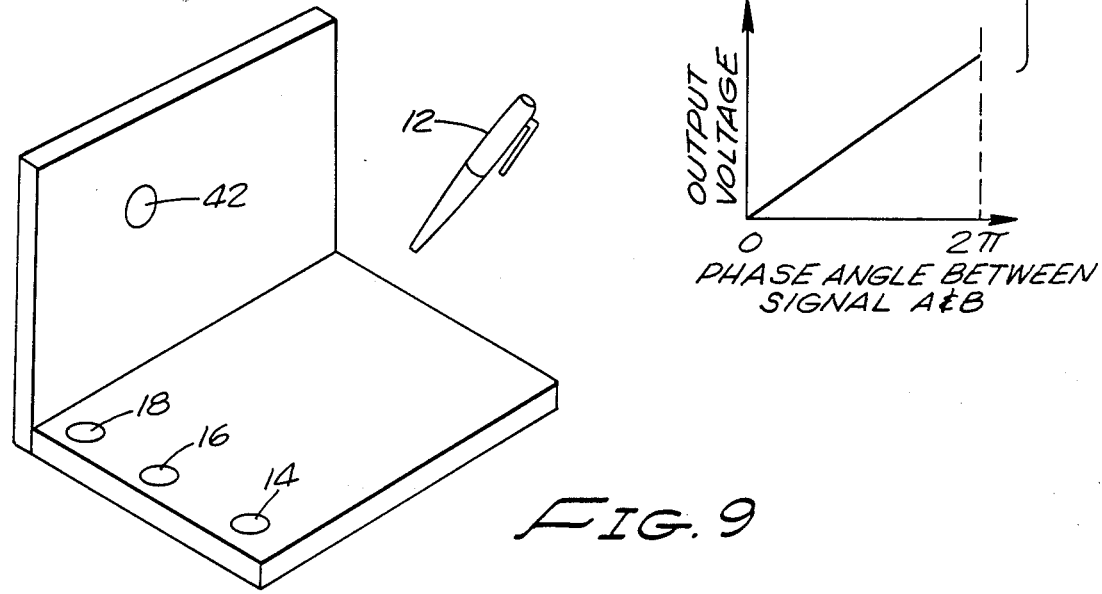
FIG. 9 is a generally perspective view of an alternate embodiment of the apparatus of the invention.

Referring now to FIG. 9 an alternate form of the apparatus of the invention is shown. This embodiment, unlike that previously described and illustrated in FIGS. 1 and 2, is suitable for determination of the transmitter location within any three dimensional space. To accomplish this three dimensional location a fourth receiver 42 must be added. The other subsystems remain the same and like numerals have been used in the drawings to identify like components. The fourth receiver 42 must be noncoplanar with the previous three. With such a receiver, a third hyperbola can readily be determined which provides the third piece of information necessary to locate the transmitter in three dimensions, the theory of operation and calculation remaining the same as previously described herein.

As previously discussed, most of the components of the apparatus of the invention are well known to those skilled in the art and are readily commercially available. For example, a laser diode of the character manufactured by the Sony Company and identified as SLD 301V, or any of a number of others may be used. In some applications, an LED such as manufactured by the Mitsubishi Company and identified as ME7022 can be used.

A Laser Diode Driver of the character manufactured by the Sony Company and identified as CXB1108Q, or any of a number of other integrated laser drivers may be used. Alternatively, the driver can be fabricated from discrete components as identified in FIG. 6. If assembled from discrete components, the resistors, capacitor, and transistor may be selected from a number that are commonly available. photo diode Detector such as those manufactured by the Mitsubishi Company and identified as PD1002, as well as other photo diodes, may be used.

With respect to the Phase Detectors, set-reset flip-flops are typically configured from more qeneric logic gates. Shown in FIG. 11 is a Sony CXB1104Q D-type flip-flop configured as an edge triggered set-reset flip-flop.

As to the Analog-to-Digital Converters, a device manufactured by Analog Devices and identified as AD578 is one of many A/D converters suitable for the present application.

In summary it is to be understood that substantial departures from the embodiments of the invention described herein are possible without departing from the scope of the invention. Some possible departures from the apparatus as previously described are as follows:

As to the Transmitter:

The transmitter need not be pen-shaped. It may be any shape suitable for the position location task at hand.

The signal emitted by the transmitter could lie anywhere within the electromagnetic spectrum or could be an acoustic signal. In principle, the emitted signal could be any form of energy that could be modulated and detected.

The medium of operation need not be air, but could a vacuum, water, or any other medium capable of conveying the energy emitted by the transmitter.

The transmitter need not have only one point of emission of the transmitted energy. The precision of the locating function could be improved if another point of emission were added, and furthermore, the device would become useful for the determination of rotational orientation of the transmitter if additional emitters were added.

As to the Receivers:

The receivers could be of any form suitable for converting the signal from the transmitter into a signal with which the necessary computations can be performed. For example, if the transmitted energy were acoustic, the receiver could be a microphone which converted the acoustic signal into an electrical signal.

If more than the minimum number of receivers is used, the accuracy and reliability of the system can be improved. (The minimum number of receivers to determine the position of the transmitter along a line is two. The minimum number of receivers to determine the position of the transmitter within a plane is three. The minimum number of receivers to determine the position of the transmitter in three dimensional space is four.)

With respect to the Phase Detector:

A wide variety of phase detectors well known to those skilled in the art are available other than the setreset flip-flop type described herein, such as exclusive-or gates and various different types of mixers.

As to Position Computation:

The position computation may be accomplished any of a number of ways, using either a digital or analog representation of the data.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A position determining apparatus, comprising:
   (a) transmitter means for transmitting modulated signals;
   (b) at least three spaced apart signal receiving means for receiving said modulated signals transmitted by said transmitter means for converting said signals to first output signals and then for transmitting said first output signals;
   (c) a first detector means for receiving and analyzing said first output signals from a selected two of said signal receiving means and then to generate and transmit a second output signal;
   (d) a second detector means for receiving and analyzing said first output signals from a selected different two of said signal receiving means and to generate and then to transmit a third output signal;
   (e) computation means for receiving said second and third output signals and for comparing said signals to determine the position of said transmitter means relative to said signal receiving means.

2. An apparatus as defined in claim 1 in which said transmitter means comprises a light emitting means for emitting signals in the form of a series of flashes of light and in which said receiver means functions to receive said signals and convert said signals to first output signals in the form of electrical signals.

3. An apparatus as defined in claim 2 in which said first and second detector means function to receive said electrical signals from said receiver means, to analyze said electrical signals to determine the phase thereof and to transmit first and second phase signals.

4. An apparatus as defined in claim 3 in which said computation means functions to receive said first and second phase signals, to compare said first and second phase signals and thereby determine the position of said transmitter means relative to said receiver means and to generate and transmit a fourth output signal.

5. An apparatus as defined in claim 4 further including display means for receiving and displaying said fourth output signal.

6. A position determining apparatus, comprising:
   (a) transmitter means for transmitting modulated signals;
   (b) first, second and third, spaced apart, co-planar, signal receiving means for receiving said modulated signals and for converting said signals to electrical signals;
   (c) a first detector means for receiving electrical signals from said first and second signal receiving means to determine the phase of said signals and to generate a first signal corresponding thereto;
   (d) a second detector means operably associated with said first phase detector means for receiving electrical signals from said second and third signal receiving means to determine the phase of said signals and to generate a second signal corresponding thereto;
   (e) computation means for receiving said first and second signals and for calculating the position of said transmitter means relative to said first, second and third signal receiving means.

7. An apparatus as defined in claim 6 in which said computation means further functions to generate and transmit a signal defining the position of said transmitter means.

8. An apparatus as defined in claim 7 in which said transmitter means comprises a generally pen-shaped housing and means for generating detectable radiation mounted within said housing.

9. A position determining apparatus, comprising:
   (a) transmitter means for transmitting modulated signals;
   (b) first, second and third, spaced apart, co-planar, signal receiving means and a fourth signal receiving means disposed in a non co-planar relationship with said first, second and third signal receiving means, each of said signal receiving means being adapted to receive said modulated signals and convert said signals to electrical signals;
   (c) a first detector means for receiving electrical signals from said first and second signal receiving means to determine the phase of said signals and to generate a first signal corresponding thereto;

(d) a second detector means operably associated with said first phase detector means for receiving electrical signals from said second, third and fourth signal receiving means to determine the phase of said signals and to generate second and third signals corresponding thereto;

(e) computation means for receiving said first, second and third signals and for calculating the position of said transmitter means relative to said first, second and third and fourth signal receiving means.

10. An apparatus as defined in claim 9 in which said transmitter means comprises a hand held housing including means for generating detectable radiation.

* * * * *